US012620514B2

(12) United States Patent
McIntyre et al.

(10) Patent No.: US 12,620,514 B2
(45) Date of Patent: May 5, 2026

(54) CONFORMAL WINDING AND CURRENT-SHARING IN A DIPOLE MAGNET USING SUPERCONDUCTING TAPE CONDUCTOR

(71) Applicants: The Texas A&M University System, College Station, TX (US); Accelerator Technology Corp., College Station, TX (US)

(72) Inventors: Peter McIntyre, Bryan, TX (US); John Scott Rogers, College Station, TX (US)

(73) Assignees: This Texas A&M University System, College Station, TX (US); Accelerator Technology Corp., College Station, TX (US)

( * ) Notice: Subject to any disclaimer, the term of this patent is extended or adjusted under 35 U.S.C. 154(b) by 432 days.

(21) Appl. No.: 18/032,899

(22) PCT Filed: Oct. 21, 2021

(86) PCT No.: PCT/US2021/056124
§ 371 (c)(1),
(2) Date: Apr. 20, 2023

(87) PCT Pub. No.: WO2022/087323
PCT Pub. Date: Apr. 28, 2022

(65) Prior Publication Data

US 2023/0395295 A1 Dec. 7, 2023

Related U.S. Application Data

(60) Provisional application No. 63/198,470, filed on Oct. 21, 2020.

(51) Int. Cl.
*H01F 6/06* (2006.01)
*H01B 12/06* (2006.01)
*H01B 12/08* (2006.01)

(52) U.S. Cl.
CPC ............... *H01F 6/06* (2013.01); *H01B 12/06* (2013.01); *H01B 12/08* (2013.01)

(58) Field of Classification Search
CPC ........... H01B 12/06; H01B 12/08; H01F 6/06; Y02E 40/60
USPC .......................................................... 174/251
See application file for complete search history.

(56) References Cited

U.S. PATENT DOCUMENTS 6,002,316 A * 12/1999 McIntyre .................. H01F 6/06 335/216
8,437,819 B2 * 5/2013 Takayasu ............... H01B 12/02 505/231
11,398,329 B2 * 7/2022 Bateman .............. A61N 5/1077
2013/0051508 A1 2/2013 McIntyre et al.

(Continued)

*Primary Examiner* — Timothy J Thompson
*Assistant Examiner* — Michael F McAllister
(74) *Attorney, Agent, or Firm* — Jackson Walker LLP

(57) ABSTRACT

A conformal dipole winding includes a superconducting tape configured with a geometry that orients a face of the superconducting tape to be parallel to a local magnetic field produced by the winding along a length of the superconducting tape. The superconducting tape forms a tape-stack cable formed from a stack of a plurality of the superconducting tapes. A face of each of the superconducting tapes is oriented parallel to the local magnetic field and is in face-face contact with adjacent superconducting tapes.

9 Claims, 18 Drawing Sheets

(56) References Cited

U.S. PATENT DOCUMENTS

| | | | | |
|---|---|---|---|---|
| 2013/0316908 | A1* | 11/2013 | Fukushima | H01B 13/30 174/125.1 |
| 2016/0163440 | A9 | 6/2016 | Meinke | |
| 2016/0247615 | A1 | 8/2016 | Gupta et al. | |
| 2018/0158586 | A1 | 6/2018 | Meinke et al. | |
| 2019/0027278 | A1* | 1/2019 | Sekiya | H01B 12/06 |
| 2020/0365304 | A1* | 11/2020 | Slade | G21B 1/057 |
| 2021/0350957 | A1* | 11/2021 | Takayasu | H01B 13/282 |

* cited by examiner

PRIOR ART

CONFORMAL WINDING AND CURRENT-SHARING IN A DIPOLE MAGNET USING SUPERCONDUCTING TAPE CONDUCTOR

CROSS-REFERENCE TO RELATED APPLICATIONS

This patent application claims priority from, and incorporates by reference the entire disclosure of, U.S. Provisional Application 63/198,470 filed on Oct. 21, 2020.

TECHNICAL FIELD

The present disclosure relates generally to dipole electromagnets and more particularly, but not by way of limitation to dipole electromagnets using thin tapes of REBCO that operate with maximum current density.

BACKGROUND OF THE INVENTION

This section provides background information to facilitate a better understanding of the various aspects of the disclosure. It should be understood that the statements in this section of this document are to be read in this light, and not as admissions of prior art.

Dipole electromagnets are used to deflect a charged particle bunch along a circular trajectory so that the charged particle passes through an aperture of the dipole electromagnet to circulate the charged particle in an orbit of constant radius in a particle accelerator. The ring of dipole electromagnets is typically the most expensive component of an accelerator. The maximum magnetic field strength $B_0$ in the aperture of the dipole electromagnet determines the momentum p of particles that can circulate in an accelerator of radius R:

$$p = qB/cR \qquad \text{Eq. (1)}$$

where q is the electric charge of the charged particles.

The winding of a dipole accelerator electromagnet comprises a multiplicity of electrically insulated turns of a conducting wire or cable that are wrapped in a uniform cross-section around a support structure containing the aperture of the dipole. The conducting wire or cable is flared at ends of the dipole to accommodate the beam tube that conveys the particles in the accelerator. FIG. 1 shows a cross-section of a superconducting CIC, containing 15 wires of NbTi/Cu wire cabled around a perforated center tube and confined within an outer sheath tube.

A magnetic field distribution is generated within the dipole aperture when an electric current is passed through the winding. The magnetic field in the dipole is also present in the winding itself, with strength $\vec{B}_n$ at the location of the $n^{th}$ turn of the winding, and the field $\vec{B}_n$ at the location of the $n^{th}$ tape produces a Lorentz force $\vec{F}_{in}$ on the current flowing within each length $\vec{L}_n$ of that conductor:

$$\vec{F}_{In} = I\vec{L}_n \times \vec{B}_n. \qquad \text{Eq. (2)}$$

One limitation to the performance of a dipole magnet is the maximum field strength that can be created in its aperture. The winding can be made from a wire or cable of a superconductor, for example round wire of NbTi, $Nb_3Sn$, or Bi-2212, or thin tapes of REBCO. Providing that the winding is operated at a temperature T that is below the critical temperature Tc of the superconductor, the winding can operate without dissipation of ohmic heat so long as the winding current does not exceed the critical current $I_c(B_n, T_n)$, which value depends upon the magnetic field B n and the temperature T n in that turn of the winding.

A second limitation to the performance of a dipole magnet containing windings of REBCO tape is that the critical current Ic(Bn, Tn, θ) is a function of the relative angle θ between the face-normal vector of the tape surface and the magnetic field vector, as illustrated in FIGS. 3A and 3B. In prior art for dipoles containing REBCO tape windings, θ~0° much different from the favorable orientation θ~90° in a multitude of locations within the winding, so that the superconducting current that can be supported is much less than would be the case in the favorable orientation.

A third limitation to the performance of a dipole magnet containing windings of REBCO tape arises for applications in which a high magnetic field strength is required. In such cases the winding must be made using a tape-stack cable of individual tapes which are clustered with normal-state electrical contact among them so that the cable current is shared among the tapes within the tape-stack cable. For such cases the REBCO tape is coated with a layer of copper, and the copper coatings of neighboring tapes are in normal-state resistive contact within the tape-stack cable. It is difficult to maintain uniform low-resistance contact resistance among the copper surfaces of neighboring tapes at all locations within a winding, so that current-sharing is problematic and can produce local ohmic heating that reduces or quenches the superconducting current capacity of the tape-stack cable. Current-sharing is further compromised because the Lorentz force upon the currents in all tapes of the tape-stack cable acts to re-direct current that flows in inner tapes of each tape-stack cable (near the inside of the overall winding geometry) to flow instead in the outer tapes of the tape-stack cable, so that those tapes reach capacity prematurely and the tape-stack cable superconducting current capacity is correspondingly reduced.

SUMMARY OF THE INVENTION

The design of an accelerator dipole is presented in which all turns of the body winding are oriented so that all the turns of REBCO tape operate with maximum current density. Each turn within the winding contains a stack of Cu-clad REBCO tapes; all tapes within the turn are compressed to provide low-resistance Cu—Cu contact among the tapes of that turn, but the successive turns are electrically isolated. Each turn is oriented so that the local magnetic field at the tapes is closely parallel to the tape surface (θ~90°). Two examples are evaluated: the 3.5 T dipole for a 500 TeV Collider-in-the-Sea, and a REBCO insert for an 18 T hybrid dipole for a 100 TeV FCC collider.

The superconducting materials Yttrium Barium Copper Oxide (YBCO) and Rare Earth Barium Copper Oxide (REBCO) are fabricated as a thin layer on a textured substrate and then clad with silver and copper. REBCO tape has the property that the critical current is strongly dependent upon the orientation of magnetic field with respect to the tape surface. A conformal winding method is presented by which all turns of a tape-stack cable containing REBCO tapes can be oriented so that all tape surfaces are closely parallel to the magnetic field at the location of each cable turn in the body region of a dipole, so that all turns of the winding can be operated with maximum critical current. A compressed tape-stack cable is presented in which a multiplicity of tapes within a tape-stack cable are bundled parallel and face-to-face and packaged to sustain a spring compression of the bundle within the winding assembly to provide low normal-state contact resistance among all tapes of all cable turns. Current is shared among the tapes by resistive transfer through the copper claddings.

A method is described in which a laminar spring is located on the inner face of each turn of tape-stack cable within a winding to provide a compressive force that maintains face-face compression of all tape faces within the tape-stack cable. The spring compliance of the laminar spring maintains compression even when there are variations of the overall compaction within the winding, for example at low winding current when Lorentz force does not yet provide compression of the tapes within the stack. The laminar spring thereby maintains the compression needed to provide low contact resistance as shown in FIG. 7.

In aspects of the disclosure, a tape-stack cable is disclosed that has a multiplicity of copper-clad REBCO tapes oriented so that the tapes are in face-face contact with one another within an overall rectangular cluster. The tapes are compressed in their face-face contact so that the contact resistance through the copper cladding is sustained at a practical minimum and is insensitive to variations in the compressive loading.

A second example embodiment is presented of a hybrid collider dipole which contains an inner sub-winding of REBCO tape-stack cable and an outer sub-winding of $Nb_3Sn$-based CIC. The sub-windings are assembled on a center structure and mechanically supported within a steel flux return. The hybrid dipole is designed to produce 18 T magnetic field in the bore tube, for use in very high energy hadron colliders. FIG. 1 shows a cross-section of the $Nb_3Sn$ CIC that is used in the outer winding of the hybrid dipole.

In aspects of the disclosure, a method is presented by which one or more turns of an auxiliary winding is positioned to selectively drive the sextupole harmonic of the dipole field, but not the dominant higher harmonics, so that the sextupole harmonic of the field can be suppressed in the aperture of the dipole. An interleaved end winding method is presented, in which additional tapes are interleaved with those of each tape-stack cable in the flared ends of the winding to provide additional immobilization against Lorentz forces.

Aspects of the invention are directed to a conformal dipole winding comprising a superconducting tape configured with a geometry that orients a face of the superconducting tape to be parallel to a local magnetic field produced by the winding along a length of the superconducting tape.

An embodiment is directed to a flared-end winding subassembly of a REBCO conformal winding of a dipole, the flared-end winding subassembly comprising: a tape-stack cable comprising a plurality of superconducting tapes, wherein a face of each of the plurality of superconducting tapes is oriented parallel to the local magnetic field at its location; and wherein each turn of the tape-stack cable of the flared-end winding assembly is connected continuously to a corresponding turn of the tape-stack cable on an opposite side of the conformal dipole by a connecting segment that follows a catenary curve that is tangent to and continuous with straight portions of a corresponding superconducting tape within the tape-stack cable in the body region of the dipole.

A further embodiment is directed to a hybrid-coil dipole magnet comprising: a conformal winding comprising a REBCO tape-stack cable configured as an insert sub-winding; and an outer sub-winding of cable-in-conduit comprising superconducting wires, wherein the outer dipole sub-winding is assembled onto an inner core structure and preloaded inside a steel flux return assembly.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 10A=sextupole block; FIG. 10B=topmost block; FIG. 10C=bottom block;

FIG. 11A=x/y slice through beginning of REBCO flared-end; FIG. 11B=x/y slice through end of dipole body; FIG. 11C=z/y slice through midplane of dipole, where each turn sweeps and returns on opposite side;

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
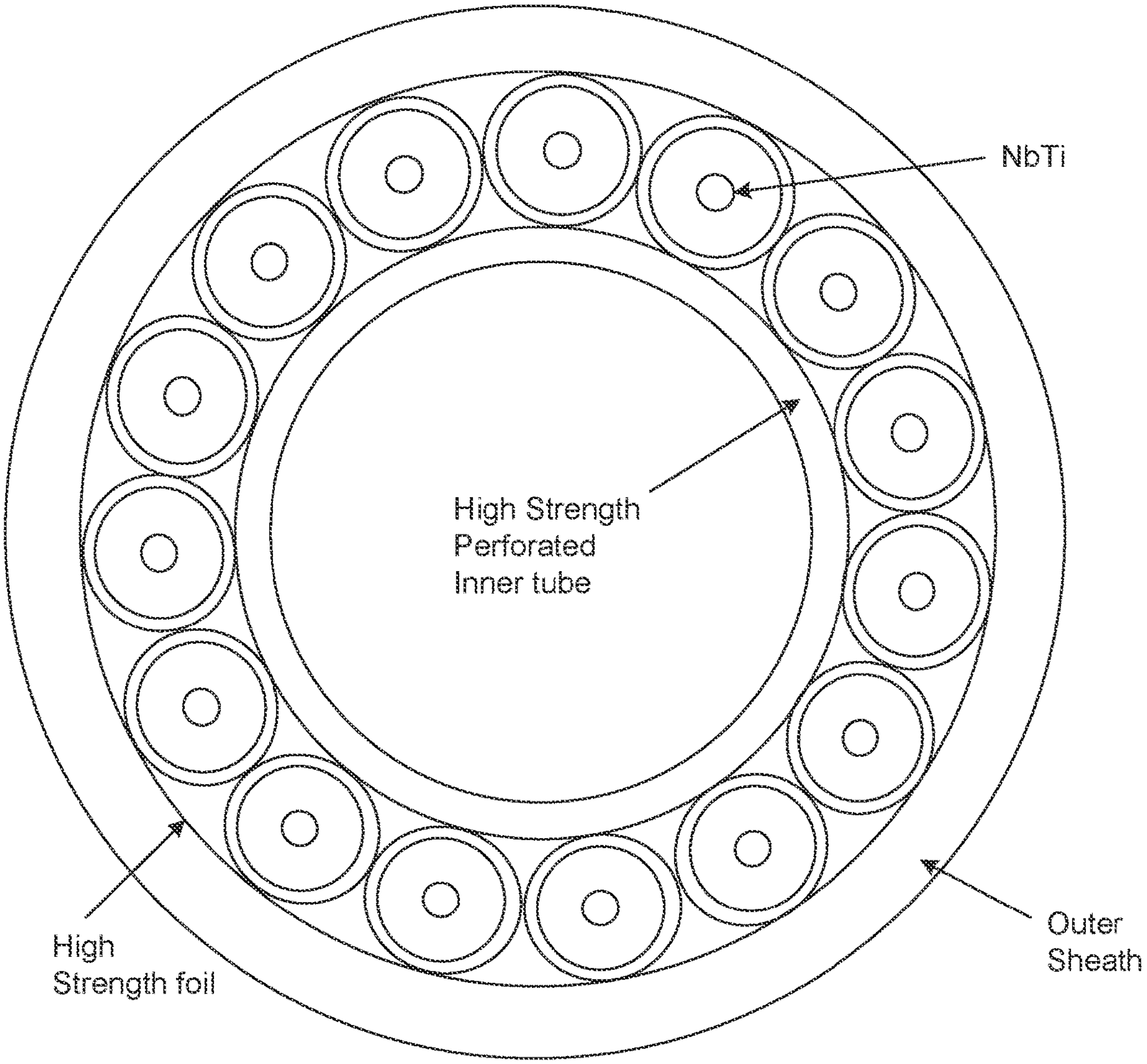
FIG. 1 is a cross-section view of one turn of a cable-in-conduit winding.
Figure 2:
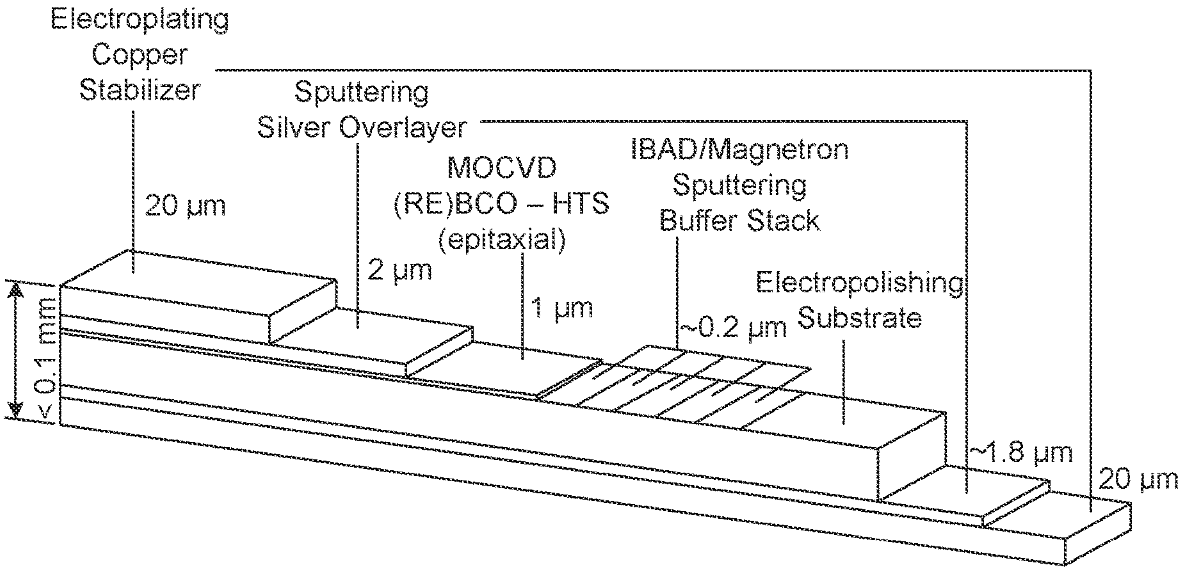
FIG. 2 is a cross-section view of REBCO tape.

REBCO superconductor offers several interesting properties, but also several challenges, as a basis for the winding of a superconducting dipole. REBCO conductor is fabricated as a thin tape, shown schematically in FIG. 2, in which a thin layer of single-crystal REBCO (typically ~1 micron thick) is grown epitaxially onto a textured substrate comprising a succession of thin layers that adapt the crystalline structure of REBCO to that of a superalloy substrate (typically Hastelloy®). Layers of silver and of copper are electrodeposited onto all surfaces of the tape to protect the superconducting layer and to provide good electrical contact between neighboring tapes that are in face-face contact.

Figure 3A:
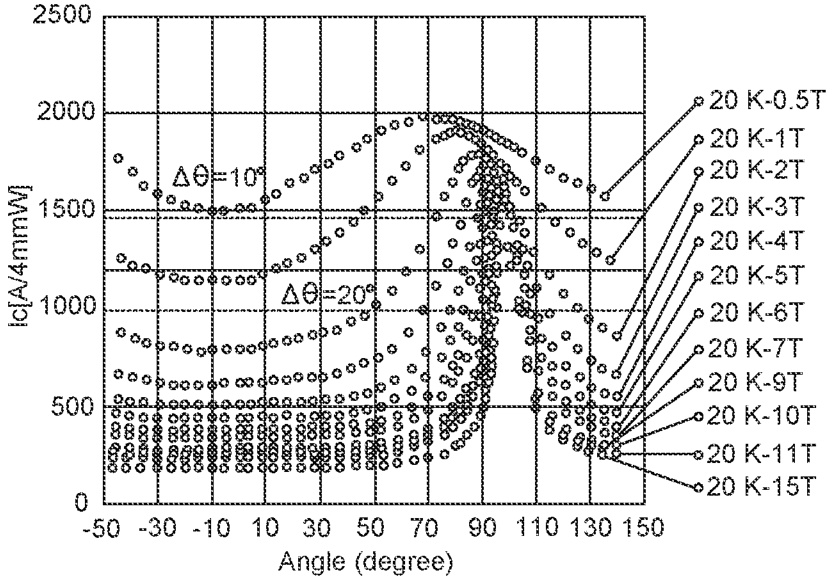
FIGS. 3A and 3B are graphs illustrating current vs. angle of field to tape surface and magnetic field at 20K and 30K, respectively.
Figure 3B:
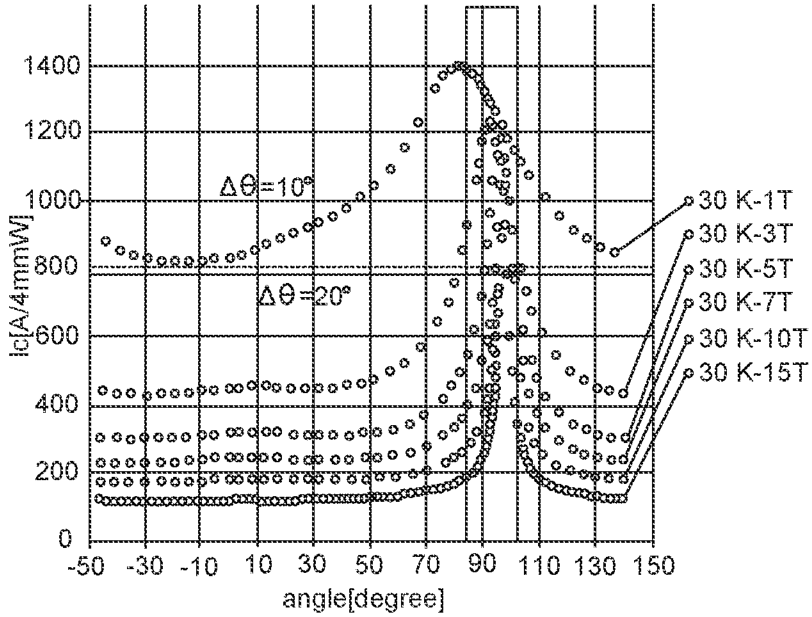

REBCO superconductor has remarkable performance for superconducting technology: first, it can operate with useful current density at liquid nitrogen temperature, and can produce very high magnetic field at temperatures of 20-40 K. But REBCO is extremely expensive, typically ~$90/m for a 6 mm wide tape capable of ~1000 A at 25 K. Second, REBCO is a strongly anisotropic superconductor—the critical current when magnetic field is oriented parallel to the tape surface is ~4 times greater than when the magnetic field is oriented normal to the tape surface. FIGS. 3A and 3B show the dependence of the critical current $I_c$ in a 4 mm wide REBCO tape on the angle between the magnetic field direction and the normal to the tape face when the tape is operating at 20 K and 30 K. The tape must be oriented so that its face is oriented no more than ~8° from the direction of the magnetic field $\vec{B}_n$ in which the tape operates, if it is to be capable of operating with $I_c$>1000 A.

TABLE 1

Critical current in a 4 mm wide REBCO tape for several field angles: maximum, minimum, angular spreads 10° and 20°.

| | | 20 K, 4 T | 30 K, 3 T | |
|---|---|---|---|---|
| Max $I_c$ ($\theta$ = 90°) | $I_{90}$ | 1700 | 1200 | A |
| Operating I for $\Delta\theta$ = 10° | $I_{10}$ | 1450 | 1000 | A |
| Operating I for $\Delta\theta$ = 20° | $I_{20}$ | 1200 | 750 | A |
| Min $I_c$ ($\theta$ = 0°) | $I_0$ | 500 | 450 | A |

It is desirable to configure the windings of a high-field dipole magnet to operate an accelerator dipole with a winding current of >10 kA, in order to limit the self-inductance of the winding. In the event that a local region within the winding loses its superconducting property (quenches), the rapid change in winding current produces an inductive voltage among the turns of the winding. Since inductance is proportional to the square of the number turns, the inductive voltage during quench can be limited by choosing a smaller number of turns (and correspondingly larger winding current). But since a single REBCO tape can carry <1 kA even in when it is oriented so that its face is parallel to $\vec{B}_n$, it would be necessary to assemble 10 or more tapes as a cluster for the conductor of a low-inductance winding.

Figure 4:
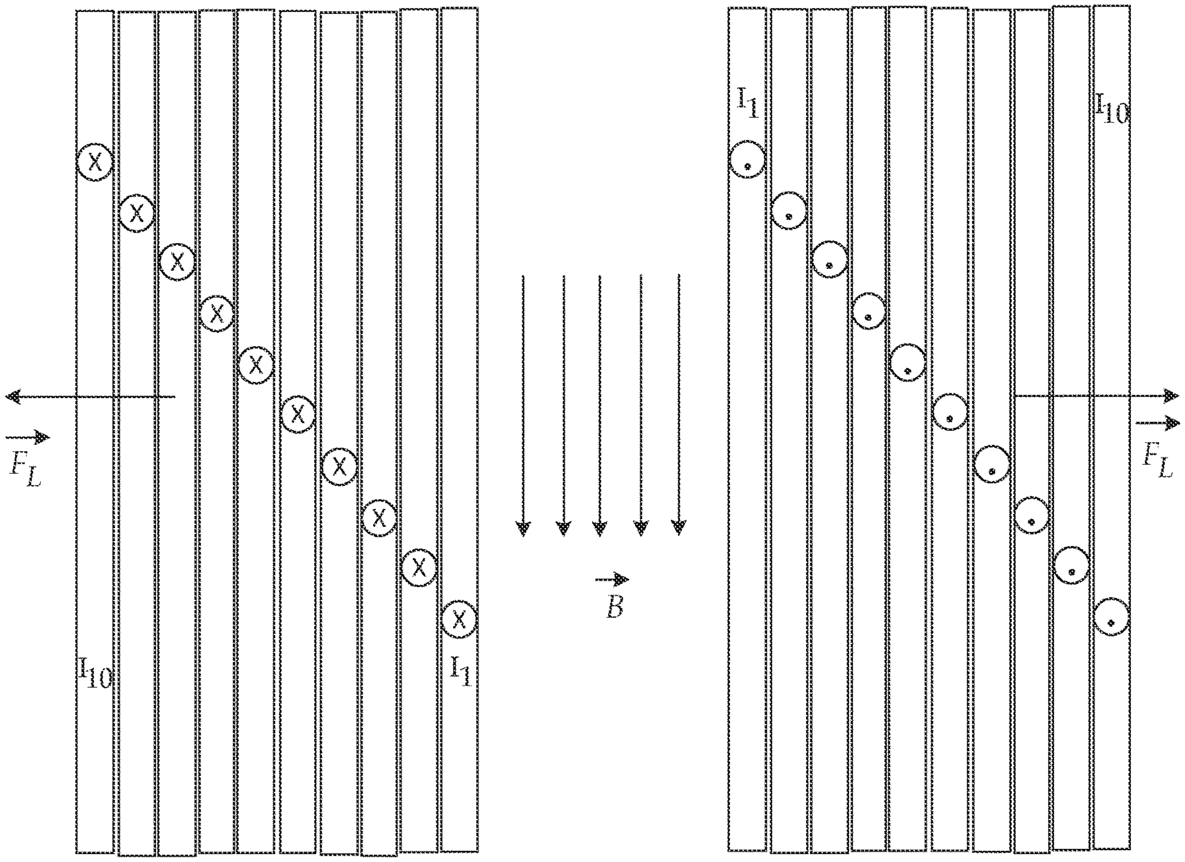
FIG. 4 is a schematic model of a single-turn dipole winding of a 10-tape cable.

Clustering REBCO tapes has been studied. In most cases, studies concerned methods by which a multiplicity of REBCO tapes can be stacked within a face-on cluster and then transposed by twisting the overall cluster. In most cases REBCO tapes are stacked in a face-on cluster, multiple clusters are cabled around a solid copper core with a twist pitch so that each cluster spends equal length on the inside and outside of the cable in a winding. Examples of prior are the CORC cable and the twisted-stack cable. Twisting is used in many superconducting winding designs to reduce inductive coupling among the clusters, but there remains a cumulative inductance among the tapes within each tape-stack cable. The property of transposition is used in many superconducting winding designs to eliminate inductive coupling among the tapes of a cluster in each turn of the winding. To understand this effect, consider a cluster of tapes in face-face resistive contact with one another within the cluster and carrying an overall current I that is distributed among the tapes as shown in FIG. 4.

When current is made to flow within a segment of length $\vec{L}$ in the winding, a Lorentz force $\vec{F}_l=I\vec{L}\times\vec{B}$ acts upon the current in a direction to shift the current outwards from the vertical mid-plane of the winding. If a given tape were located in the cluster closest to the center of the dipole winding, its current $I_1$ would experience an outward-directed force that would transfer that current to the next tape, and so forth, so that current would be concentrated in the outermost tape. As cable current were increased, the current $I_{10}$ in the outermost tape would reach its critical current limit and quench before significant current would flow in the inner tapes.

Inductive forces on the currents among the tapes of a cable also produce AC losses as cable current is ramped up or down. If a tape is oriented normal to the magnetic field at the tape, increasing or decreasing the magnetic field induces an electromotive force (emf) to drive a loop current to flow within the plane of the tape, further reducing the tape's superconducting current capacity. Inductive forces on the currents in neighboring tapes likewise produces an emf between neighboring tapes that drives current through the normal-conducting copper layers between them.

In the above-mentioned uses of REBCO-based cables, transposition is used to suppress inductively driven current inhomogeneity and AC losses in the cable. The cluster of tapes is twisted along the length of the winding, so that each tape transposes from an inside location to an outside location as it traverses each twist pitch in the winding. Transposition has the consequence, however, that the superconducting current capacity of the cable is limited to its minimum value $I_0$ corresponding to when the tape is oriented normal to the field at conductor, since there is one location along each twist pitch of the cable at which the cluster has that orientation.

Conformal Winding to Optimize Critical Current in a REBCO Tape Winding

A conformal winding is made in which each turn of tape-stack cable is oriented so that the tape faces are closely parallel to the magnetic field that will be produced by the conformal winding. In particular the tapes within a tape-stack cable are not transposed—the orientation of each tape in its local magnetic field is sustained in the parallel orientation that yields maximum superconducting current capacity.

The current capacity of the $n^{th}$ tape in each cluster can be estimated by extracting the local sheet current density $K_n(x)$ an adding it up for the entire tape width:

$$I_{cn} = \int_0^w K_n(x)dx \quad \text{Eq. (3)}$$

Using this method, for the particular dipole design shown, the cable critical current is ~80% of its ultimate value if the local magnetic field were everywhere parallel to the tape surface for all turns. The conformal winding thus requires three times less REBCO tape as would a winding in which all tape stacks were oriented vertically, or one utilizing a transposed cable.

Two versions of the design have been prepared and optimized: one with N=18 tapes in the tape-stack cable to produce 3.5 T bore field at short-sample limit; the other with N=28 tapes in the tape-stack cable to produce 4.5 T bore field. Both versions have been optimized to produce approximately homogeneous field distribution in the bore.

Figure 7:
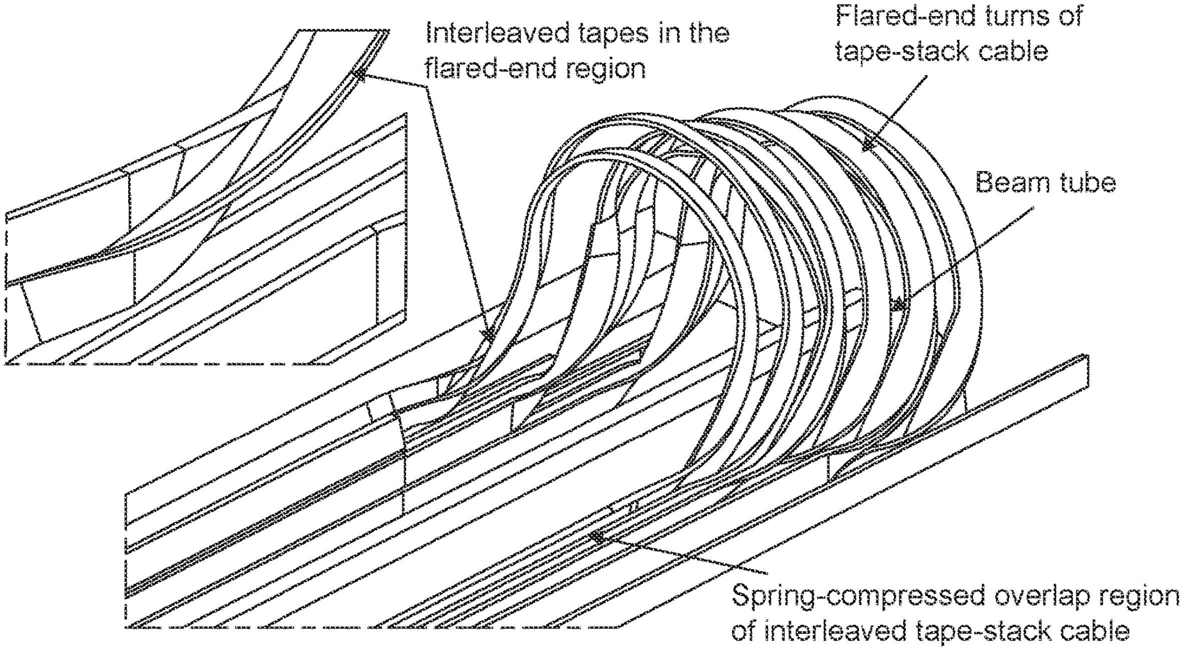
FIG. 7 is a schematic view of a reinforced end winding in which additional tape segments are interleaved between the tapes of each tape-stack cable turn to augment its Ic in the flared-end turn.

A method is presented whereby the flared ends of each turn of tape-stack cable can be supported with a catenary curve that preserves the alignment of the tape face with the local magnetic field everywhere around the flared ends so that misalignment does not compromise the operational current capacity. FIG. 7 shows a flared-end quadrupole which contains a conformal winding of many turns of a dip-process $Nb_3Sn$ tape. Each turn of tape is twisted about its axis as it is flared vertically to form a catenary in which all tapes remain as a stack but no tape is bent in the hard direction.

We have adopted a similar method for the flared ends of a conformal winding. We have calculated the 3-D magnetic field distribution in the flared end, and we have been able to adjust the catenary curve on which each turn of tape-stack cable is formed so that the tape faces are everywhere closely parallel to the local magnetic field direction.

Figure 11A:
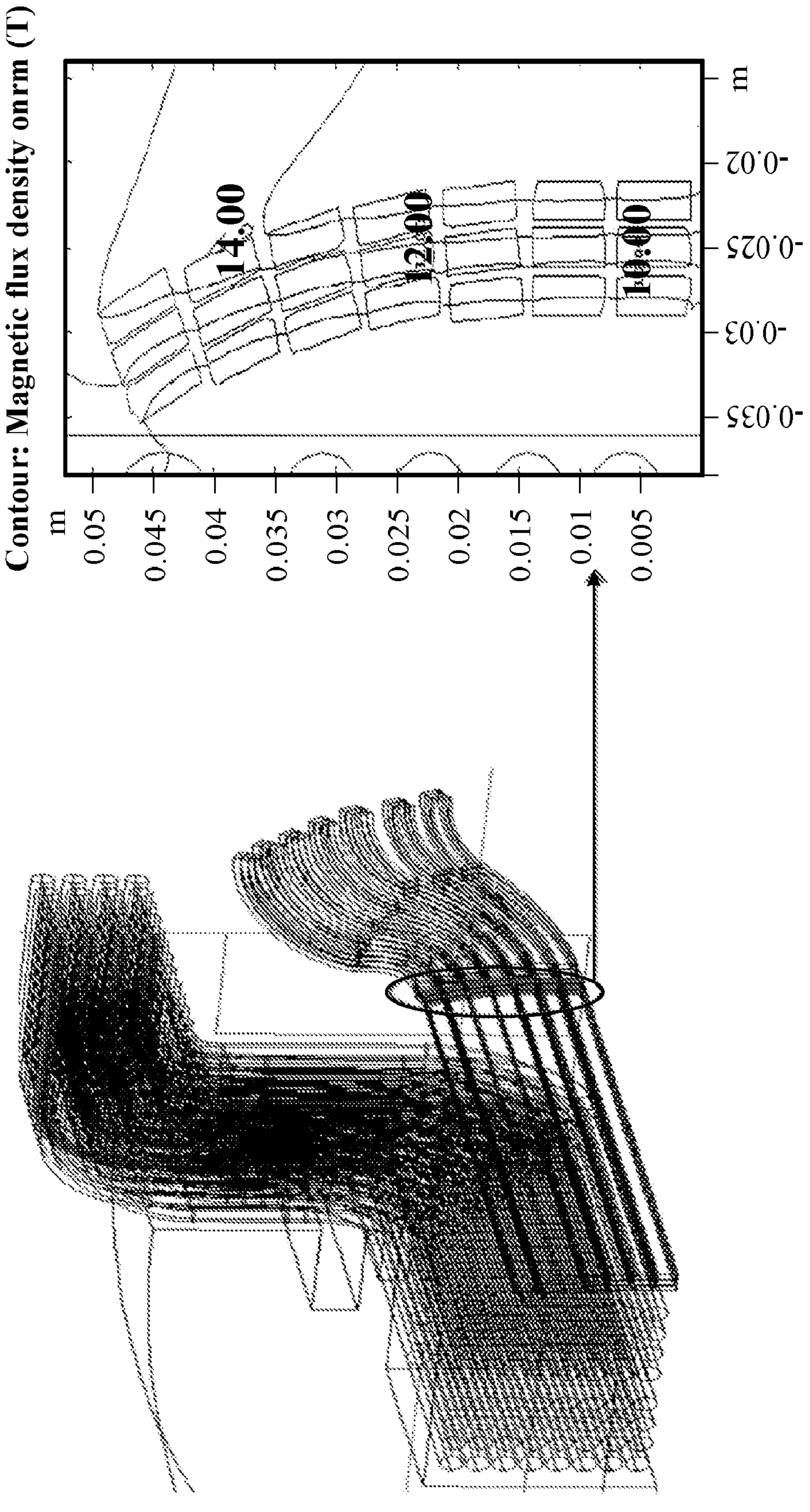
FIGS. 11A to 11C show 3D sections through the flared-end winding of the hybrid dipole, showing the distribution of the magnitude and direction of magnetic field in all 3-turn blocks at three cross-section slices through the flared end.
Figure 11B:
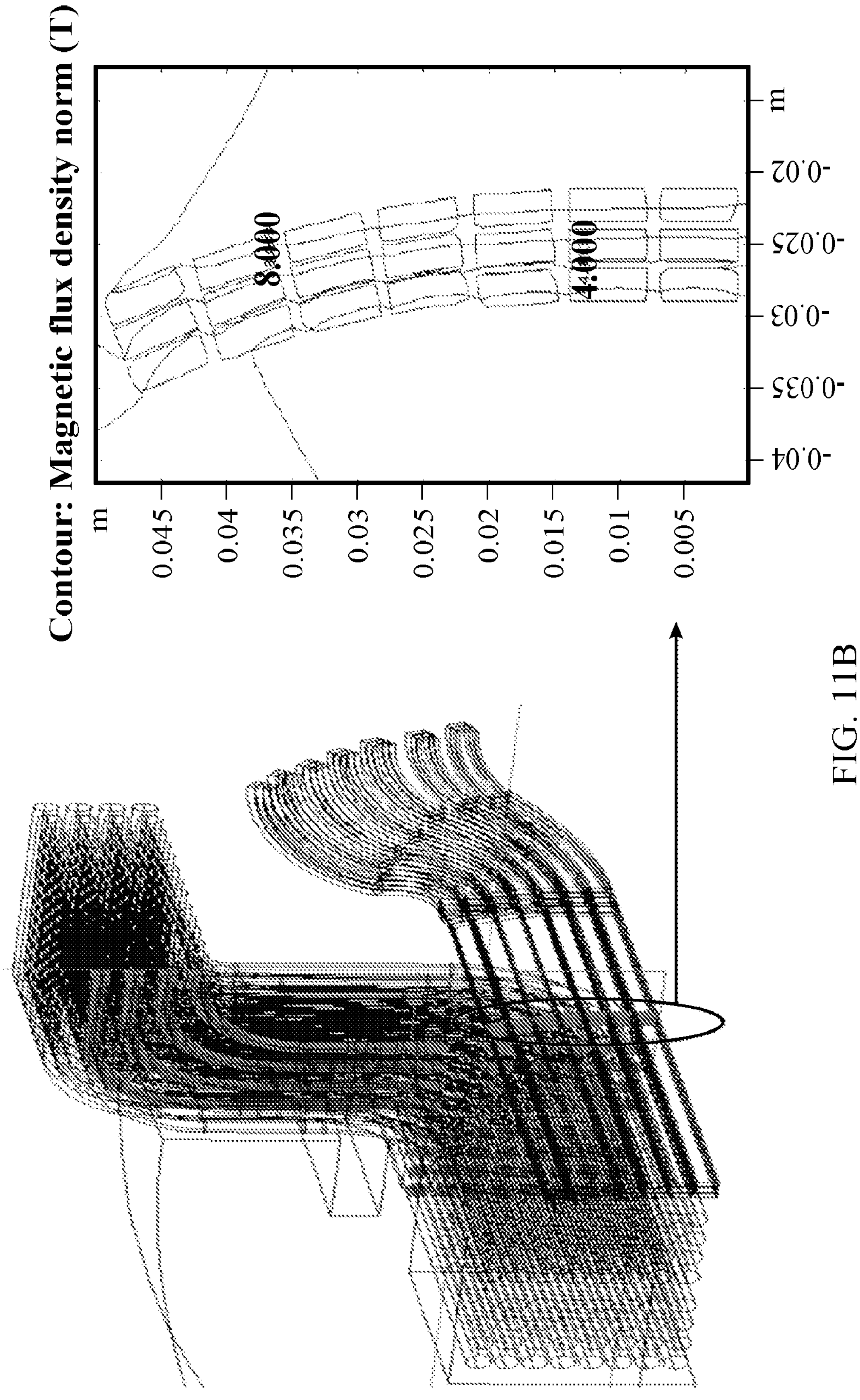
Figure 11C:
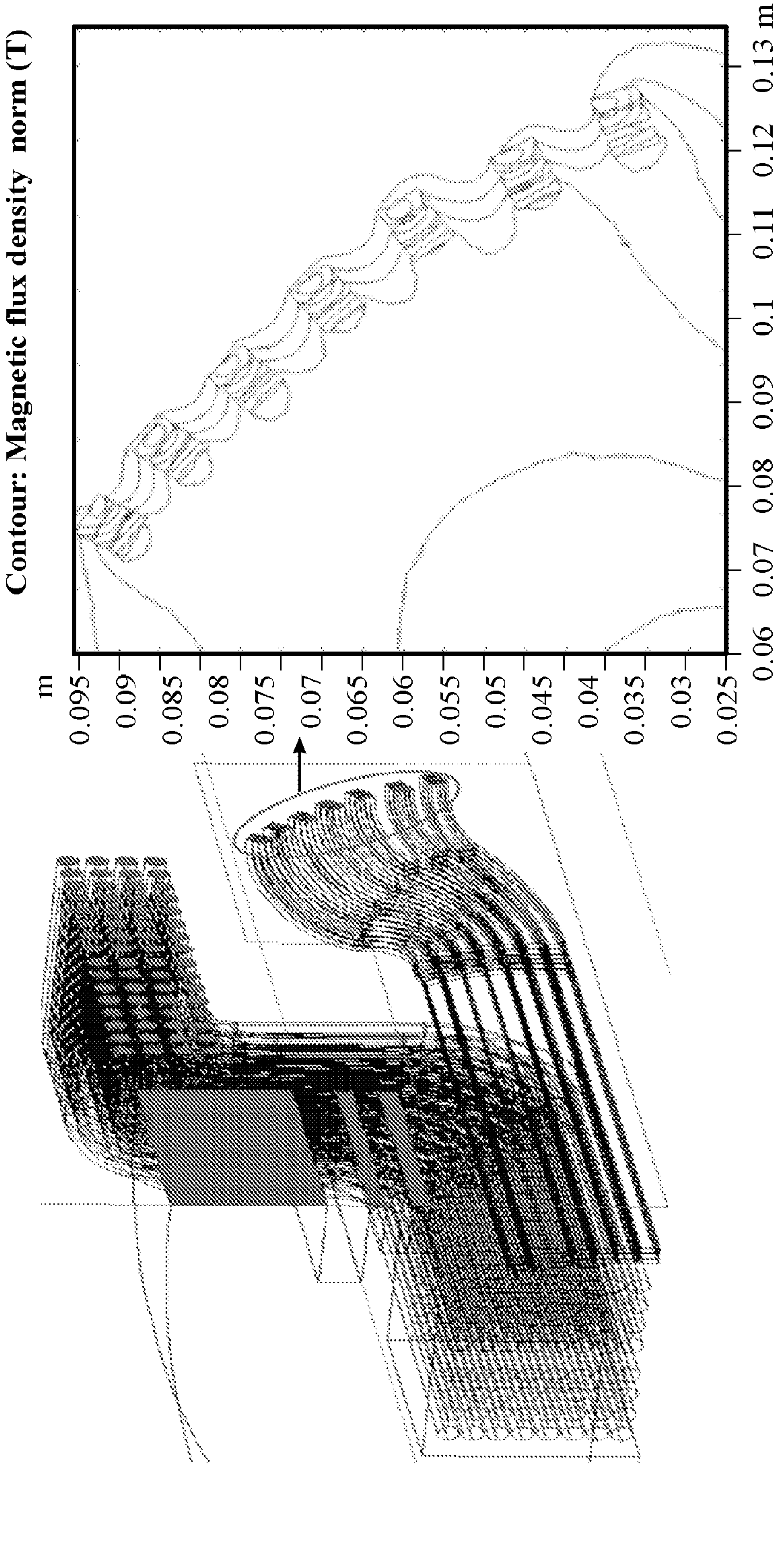
Figure 12:
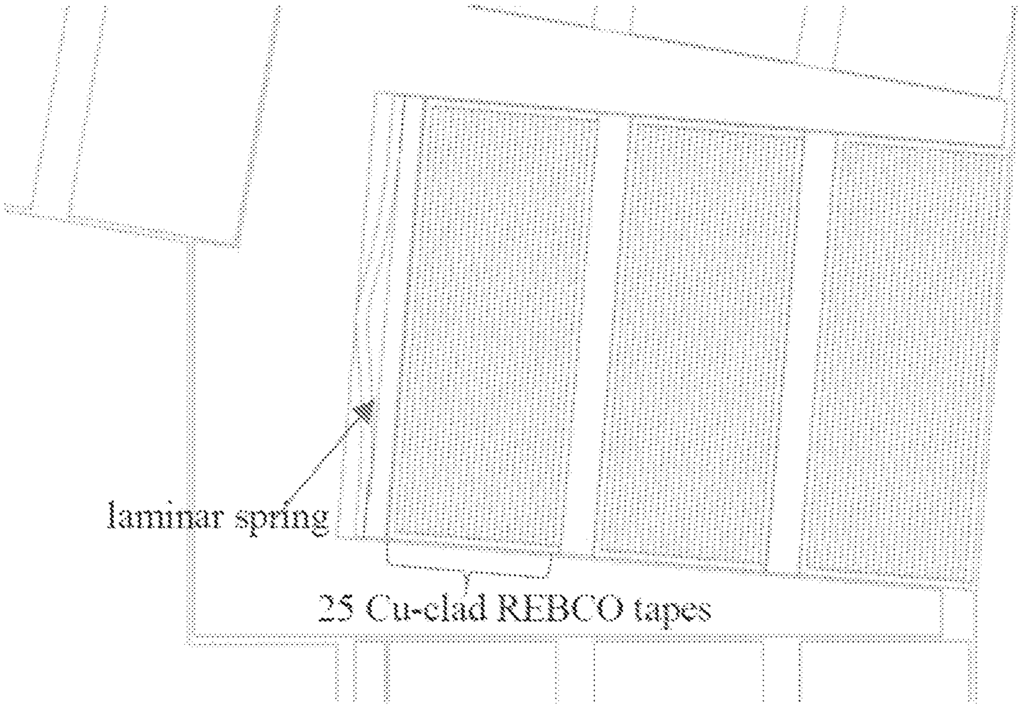
FIG. 12 shows detail of a block of 3 tape-stack tapes, each containing 25 tapes, with a laminar spring to provide uniform ~1 MPa compression to all cables.
Figure 13:
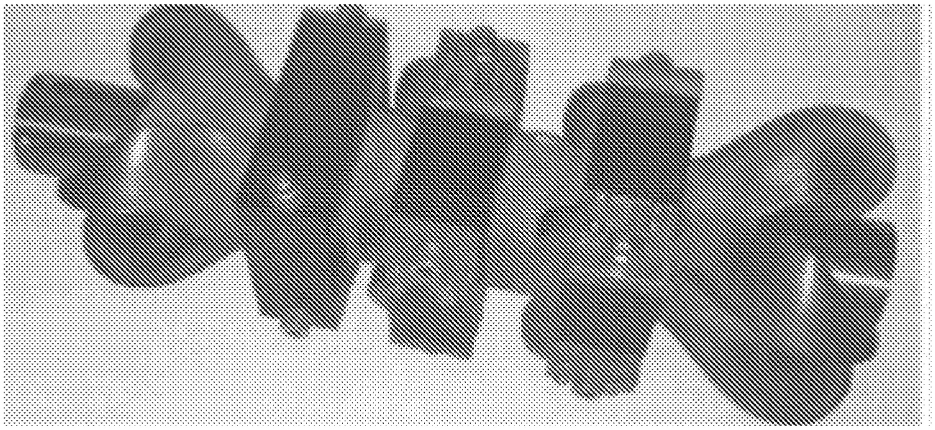
FIG. 13 shows flared-end quadrupole winding from prior art (W. Sampson, 1970), showing how tape conductor can be wound on a catenary curve to accommodate a beam tube while forming a compact stacking of the tapes throughout the flared ends.
Figure 14:
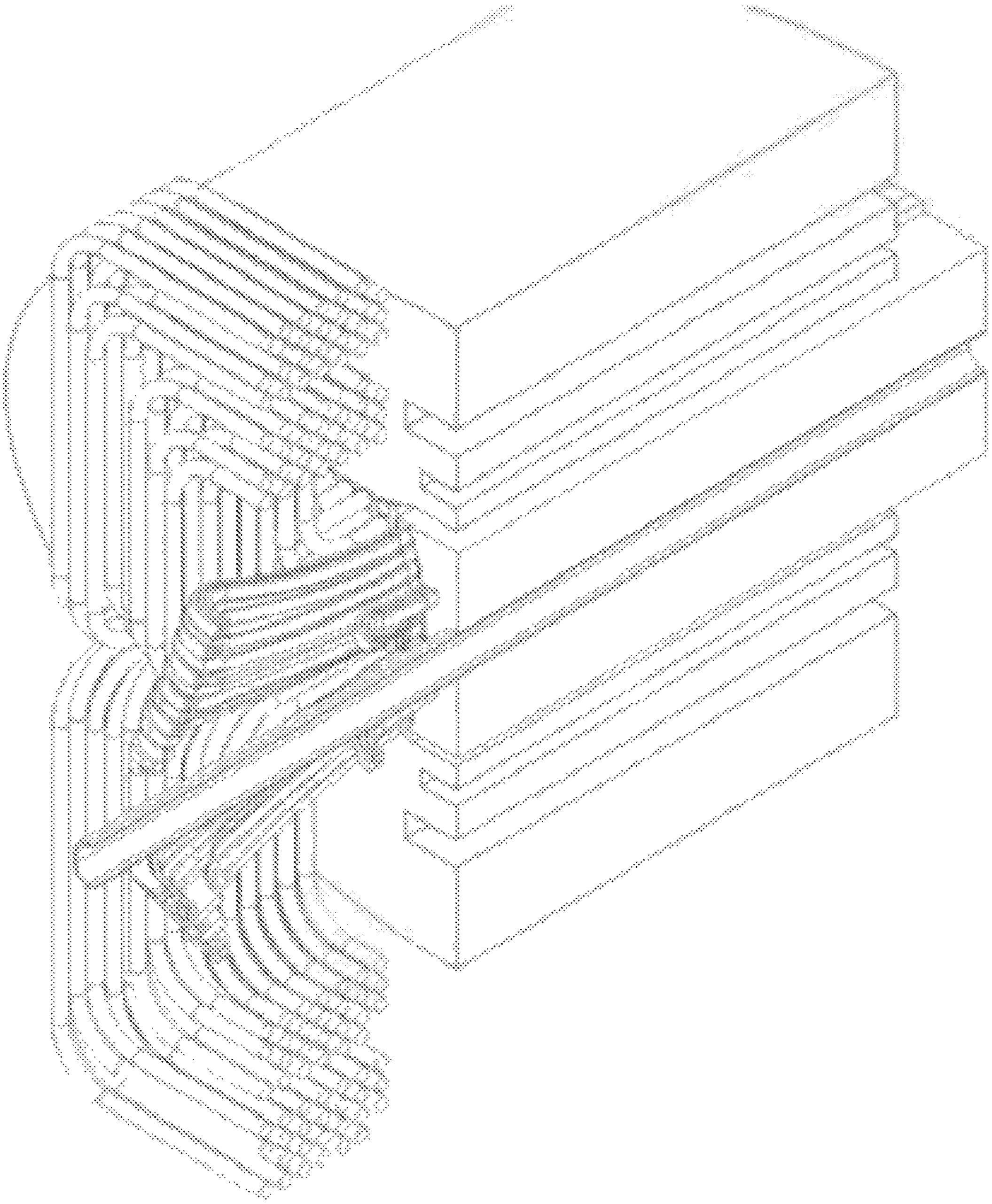
FIG. 14 shows the end region of the windings of the 18 T hybrid dipole, showing cutaway detail of the flared-end region of the REBCO inner winding and the CIC outer winding.

This twisted-flare end was modeled in a 3-D CAD design of the flared end, and the fields have been modeled using 3-D COMSOL. FIGS. 11A to 11C shows the results in three example cross sections through the end region: a) a y/z cross section through the vertical midplane; b) an x/y cross section at the transition from body to flared end; and c) an x/y cross section at a location 3 cm into the body from that transition. We have estimated $I_c(|\beta|,\theta)$ for each tape within each layer of each cross section using the data of FIG. 4, and added them to obtain the $I_c$ in each tape-stack cable at that location.

There is a compensating interplay that sustains $I_c$ with little or no degradation through the flared ends: the inner tapes are well-aligned to with the field direction but have the strongest value, while the outer tapes flare with significant angle with respect to the field but the field strength is low enough that the angular dependence of $I_c$ is also broadened. The flared-end regions do not present a 'weak sister' limit to the $I_c$ of the cable in any turn of the winding.

Current-Sharing Among Tapes in a Compressed Tape-Stack Cable

As the dipole is ramped to increase the magnetic field bore from its value $B_{0i}$ at injection energy to $B_{oc}$ at collision energy, the current within each tape-stack cable must increase proportionately. But the magnetic field at each cable produces a Lorentz force upon the current that is flowing in the cable. The Lorentz force is determined using the following:

$$\vec{F}_B = I\vec{l} \times \vec{B}(x) \quad \text{Eq. (4)}$$

The Lorentz force pushes current flowing within each tape-stack cable ($\hat{z}$) away from the dipole bore ($\hat{x}$). Thus, even if current were injected so that it was initially distributed equally among all tapes within a cable, the Lorentz force would re-distribute current to the outermost tapes of each tape-stack cable. It would therefore seem that, as coil current is increased, the outermost tape would quench when the overall cable current was still only a small fraction of the desired cable current.

But REBCO can operate at 30 K, where the heat capacity of the tape ($\propto T^3$), and the conduction to remove heat ($\propto[T_{hot}-T]/T$) are both much greater, so it should be possible to operate a cable of stacked non-insulated tapes without transposition and rely upon the 'soft' approach to quench in each tape to force re-distribution of current within the cable as the cable current is further increased. This strategy has been used to good effect in 'no-insulator' (NI) pancake windings for high-field solenoids. In the instant disclosure, the dynamics of quasi-equilibrium current-sharing among the ~10 tapes within a non-transposed cable are analyzed.

The dynamics are analogous to the Hall effect, except that each tape provides superconducting transport along the $\hat{z}$ direction, while there is a resistance/length $\tilde{R}_x$ between adjacent tapes that creates a transverse electric $E_x$ field when current is displaced in the $\hat{x}$ direction. $E_x$ is produced because a potential difference develops between neighboring tapes when they carry different currents. The REBCO layer within each tape is not an ideal superconductor, but exhibits an electric field $E_z$ that is current dependent:

$$E_Z = E_0\left(\frac{I}{I_c}\right)^n \quad \text{Eq. (5)}$$

where $E_0=10^{-6}$ V/m is the quench criterion, $I_c$ is the quench current for the conditions B, T, θ for that tape, and n is the index that characterizes the power-law dependence of the superconductor-normal transition for that value of B, T, θ. For REBCO at T=20 K, B=4 T:$I_0$~1.5 kA, n=24.

The time dependent distribution of current in a tape-stack cable can be modeled using two methods. A first simple model treats the full length of one half-turn of the tape-stack cable as a series-parallel L/R network; then refine that to make a 2-D finite element model containing 10 turns of tape-stack cable in each half-core, then model the 3-D winding of an entire 300 m-long dipole.

Each tape within a half-turn of one tape-stack cable has a self-inductance L, a power-law series resistance $R_s$, and a parallel resistance $R_p$ to each of its neighbors. The self-inductance per unit length $\tilde{L}$ for one turn of tape can be estimated by calculating the magnetic flux in the dipole that is produced by a current I in one tape:

$$\tilde{L} = \frac{u_0 x}{wg} = 4 \times 10^{-4}\ \text{H/m} \qquad \text{Eq. (6)}$$

where w=6 mm is the tape width, g=10 cm is the vertical gap in the steel flux return, and x~10 cm is the horizontal width of the tape loop.

A second more detailed model of the mutual inductance between two parallel tapes (but with no steel flux return) gives:

$$M = \frac{u_0 l}{2\pi}\left[\ln\frac{2l}{d} + \frac{1}{2} - 2\frac{d}{a}\tan^{-1}\frac{a}{d} - \frac{1}{2}\left(1 - \frac{d^2}{a^2}\right)\ln\left(1 + \frac{a^2}{d^2}\right)\right] \qquad \text{Eq. (7)}$$

The series resistance per unit length R̃ is obtained from Eq. 5:

$$\tilde{R}_s = \frac{E}{I} = \frac{E_0}{I_0}\left(\frac{I}{I_0}\right)^{n-1} = (0.7\ \text{n}\Omega/\text{m})\left(\frac{I}{I_0}\right)^{n-1} \qquad \text{Eq. (8)}$$

Figure 5:
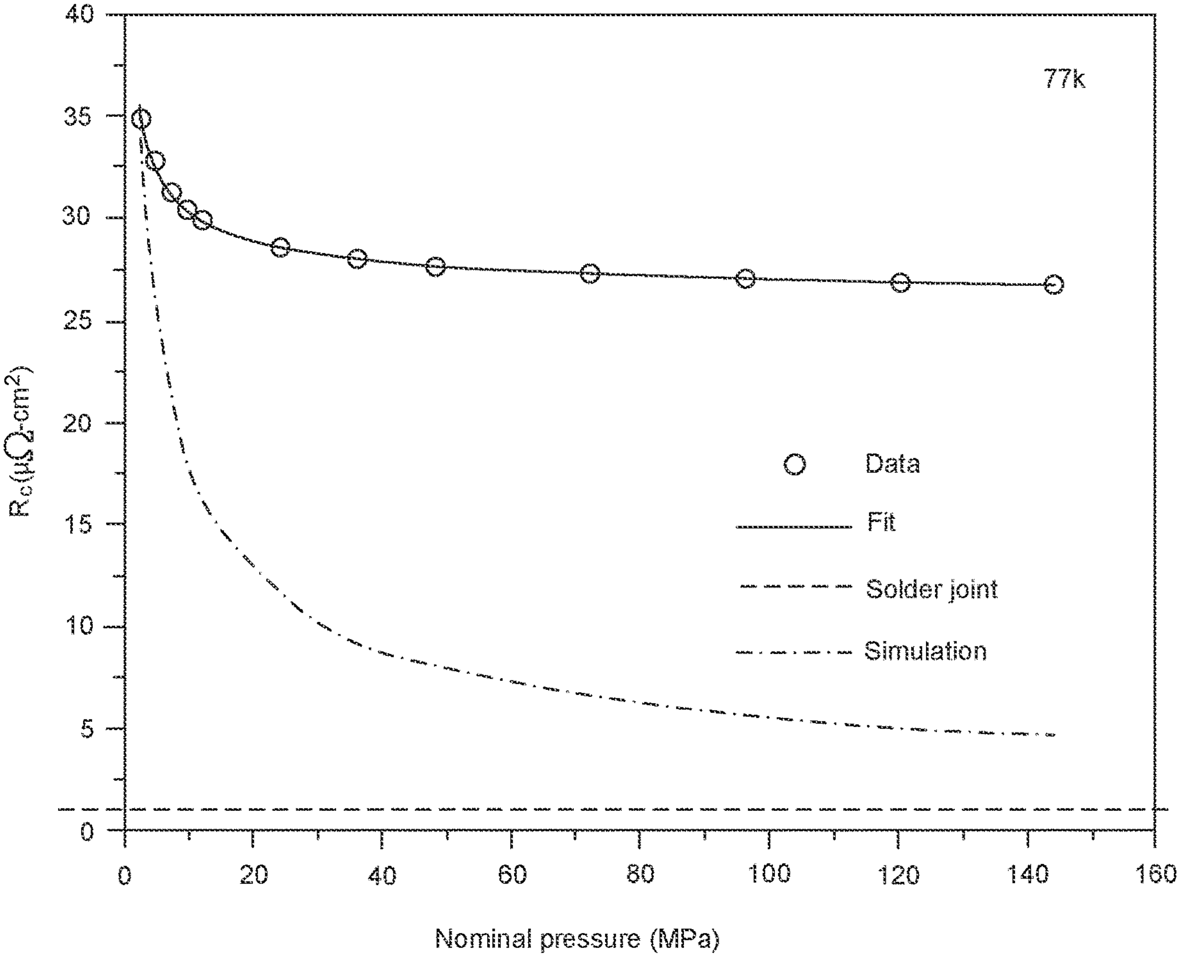
FIG. 5 is a graph showing contact resistance between two copper-clad REBCO tapes as a function of compression.

The parallel resistance $R_p$ is dominated by the contact resistance $R_c$ between the two copper-clad surfaces of neighboring tapes, and is inversely proportional to the face area of the tape. The dependence of $R_c$ upon the compression among the tapes in the stack were measured and are shown in FIG. 5.

The tape-stack cable in the conformal winding is supported in a spring-loaded structure that provides uniform compression of the tapes within the tape-stack with ~1 MPa compression, corresponding to contact resistance $R_c$~35 μΩ-cm$^2$. The parallel resistance of a length $\mathcal{L}$ of a tape to each of its neighbors is:

$$R_p = \frac{R_c}{\mathcal{L}w} = \frac{(0.6\ \mu\Omega\cdot\text{m})}{L} \qquad \text{Eq. (9)}$$

From these quantities, we can extract two results that characterize the scale of current-sharing. First, $R_p$ and $R_s$ operate as a voltage-divider that tends to homogenize the current distribution within a stack of tapes. The scale length λ over which this homogenization operates is the winding length for which $R_p$~$R_s$:

$$\lambda = \sqrt{\frac{R_c}{w\tilde{R}_s}} = 29m\left(\frac{I}{I_c}\right)^{-11.5} \qquad \text{Eq. (10)}$$

The scale length is much longer than any reasonable winding length, so the current distribution would relax uniformly along the winding.

Second, it is estimated that the time constant with which a difference in current between successive tapes in a tape-stack cable relaxes to an equilibrium governed by the Lorentz force and the 2-D distribution of resistance within a tape-stack cable. The change in inductance along one winding length $\mathcal{L}$ between one tape and the next is:

$$\text{dL} = \frac{u_0}{wg}dx = 0.4\ \mathcal{L}\text{uH} \qquad \text{Eq. (11)}$$

So the time constant for relaxation between the succeeding layers is:

$$\tau \sim \frac{\text{dL}}{R_p} \sim (1s)\mathcal{L}^2 \qquad \text{Eq. (12)}$$

The relaxation cannot support rapid ramping of a dipole, but for applications in accelerators the winding re-distributes current rapidly enough that no tape should reach critical current until close to the d.c. limit of the cable.

Figure 6:
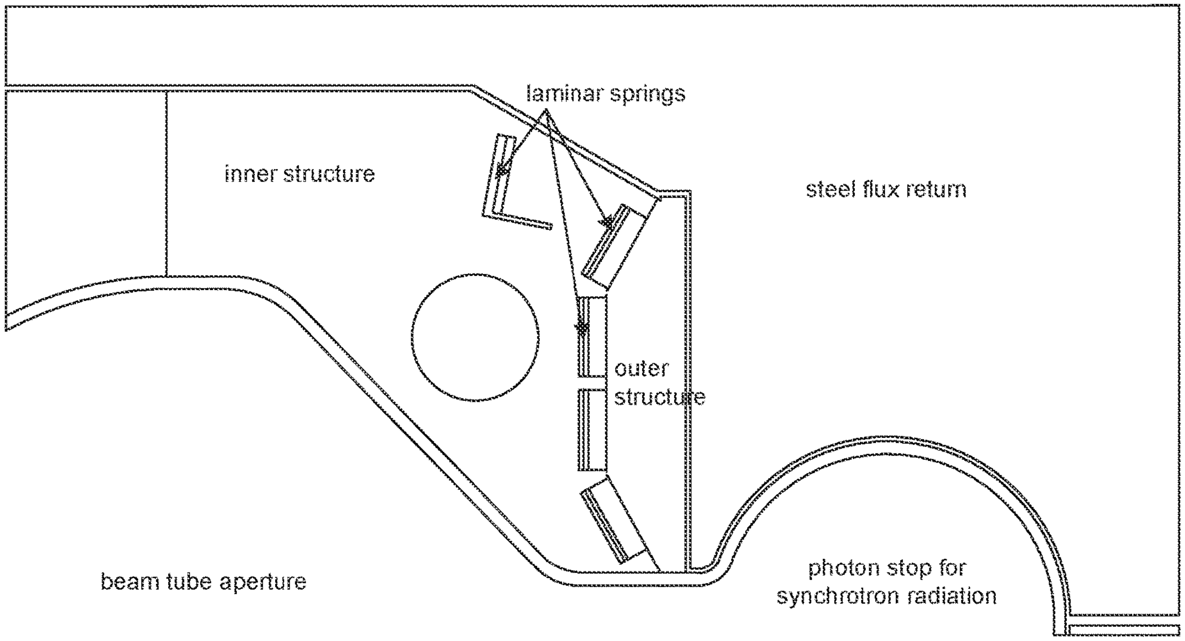
FIG. 6 is a schematic of a structural assembly of one quadrant of a conformal-winding dual dipole: tape-stack cables supported in cavities between inner and outer structural elements, compressed by laminar springs, contained within a steel flux return assembly—a detailed view is presented in FIG. 8.
Figure 8:
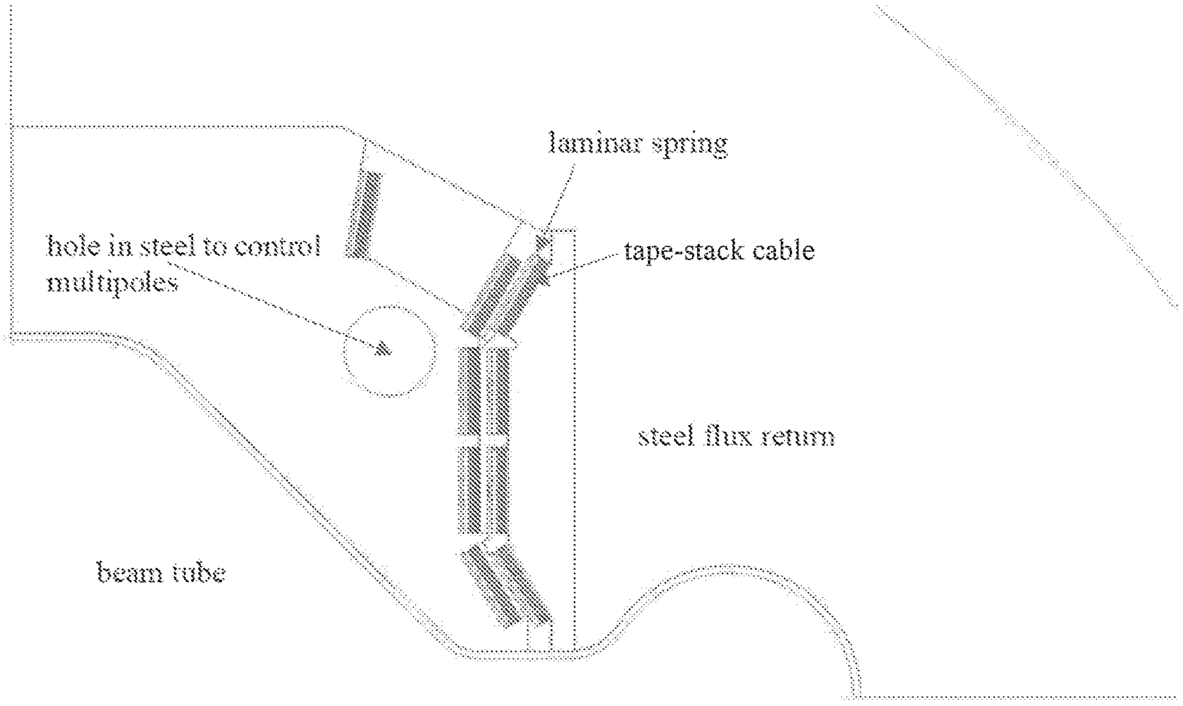
FIG. 8 shows a detailed view of a structural assembly of one quadrant of a conformal-winding dual dipole: tape-stack cables are supported in cavities between inner and outer structural elements, compressed by laminar springs, and contained within a steel flux return.
Figure 9:
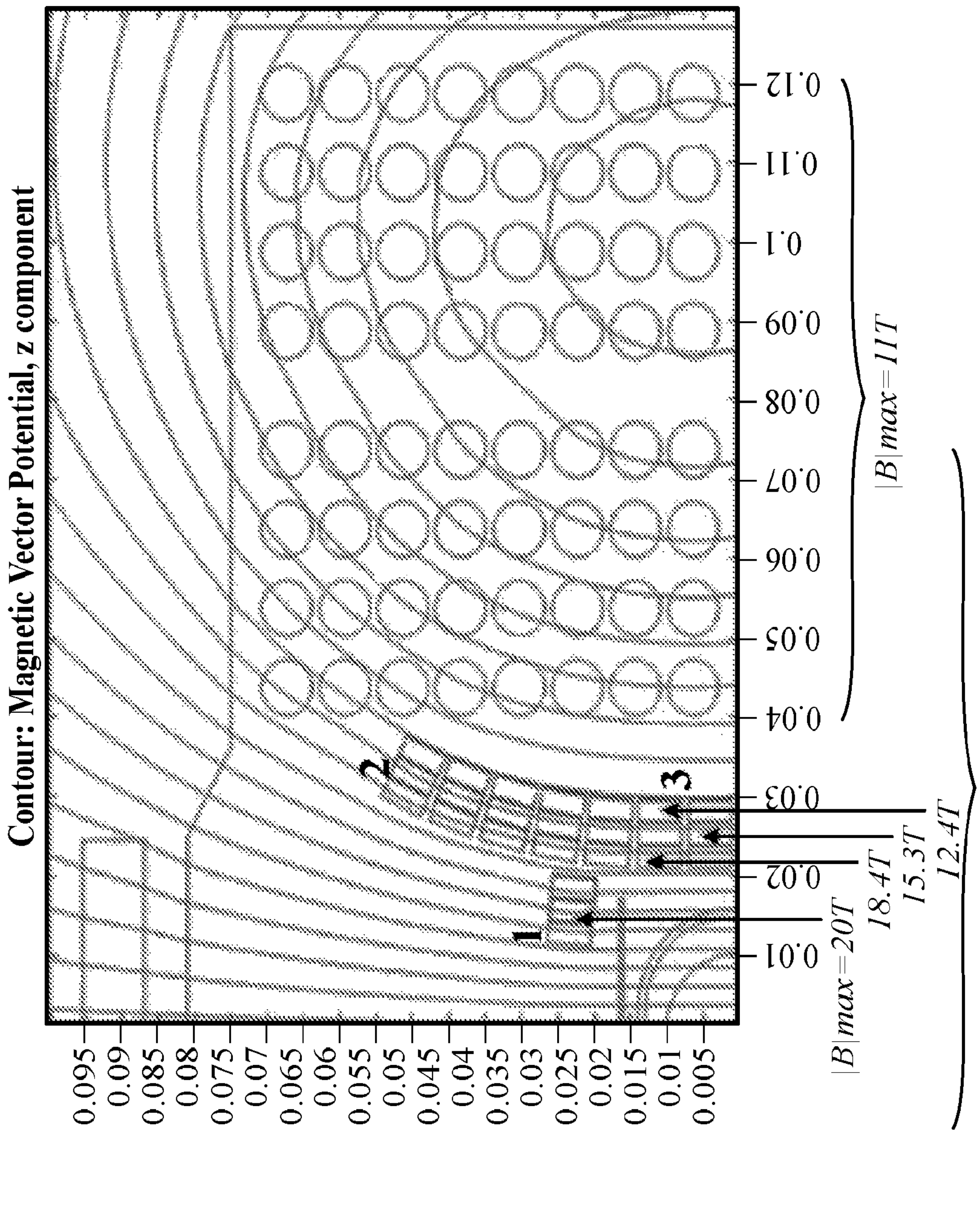
FIG. 9 shows the top-right quadrant of an 18 Tesla hybrid dipole, showing the arrangement of REBCO tape-stack cable turns in the inner winding, and the arrangement of $Nb_3Sn$ CIC turns in the outer winding. The maximum magnetic field strength is shown for each layer of the REBCO tape-stack winding and for the $Nb_3Sn$ CIC winding.
Figure 10A:
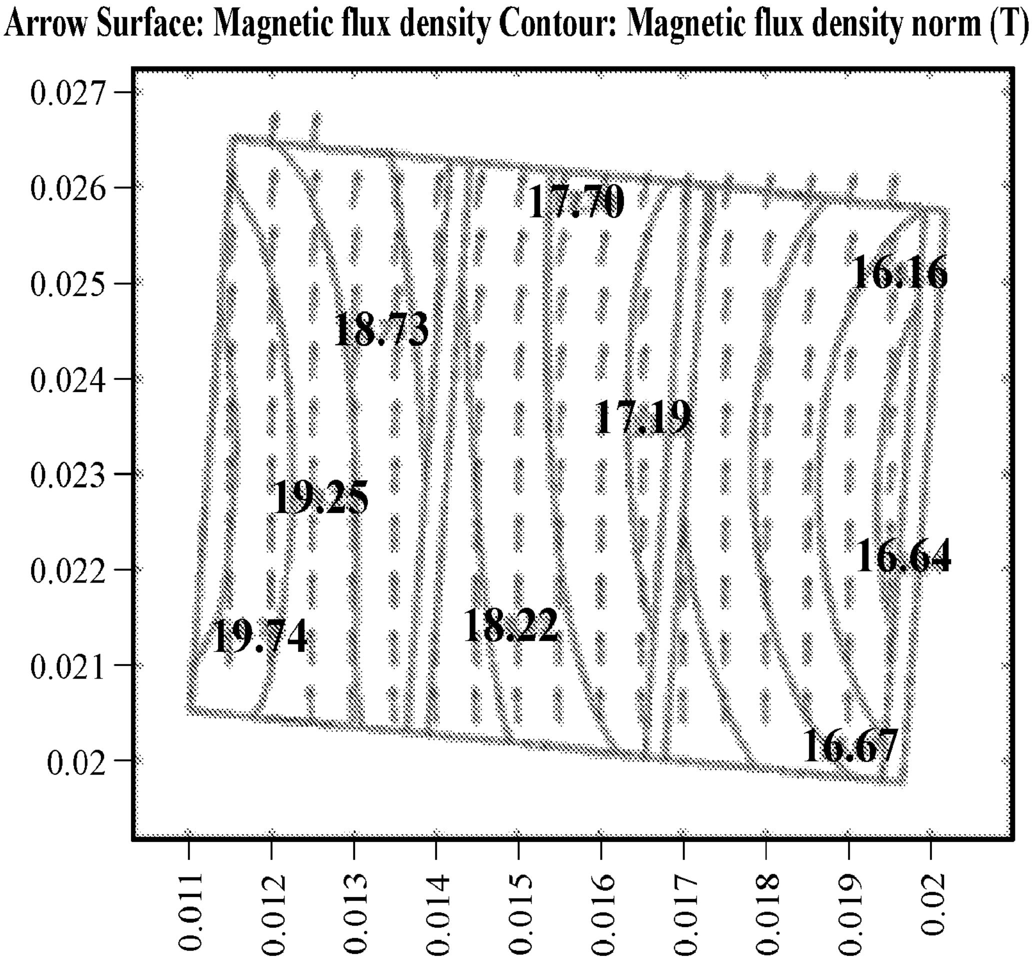
FIGS. 10A to 10C show a detailed view of three 3-turn blocks of tape-stack cable in the REBCO inner winding of FIG. 9, in each case showing the distribution of the magnitude (T) and direction of the magnetic field in the 25 tapes within each cable. The blocks are indicated by numbered oval in FIG. 9.
Figure 10B:
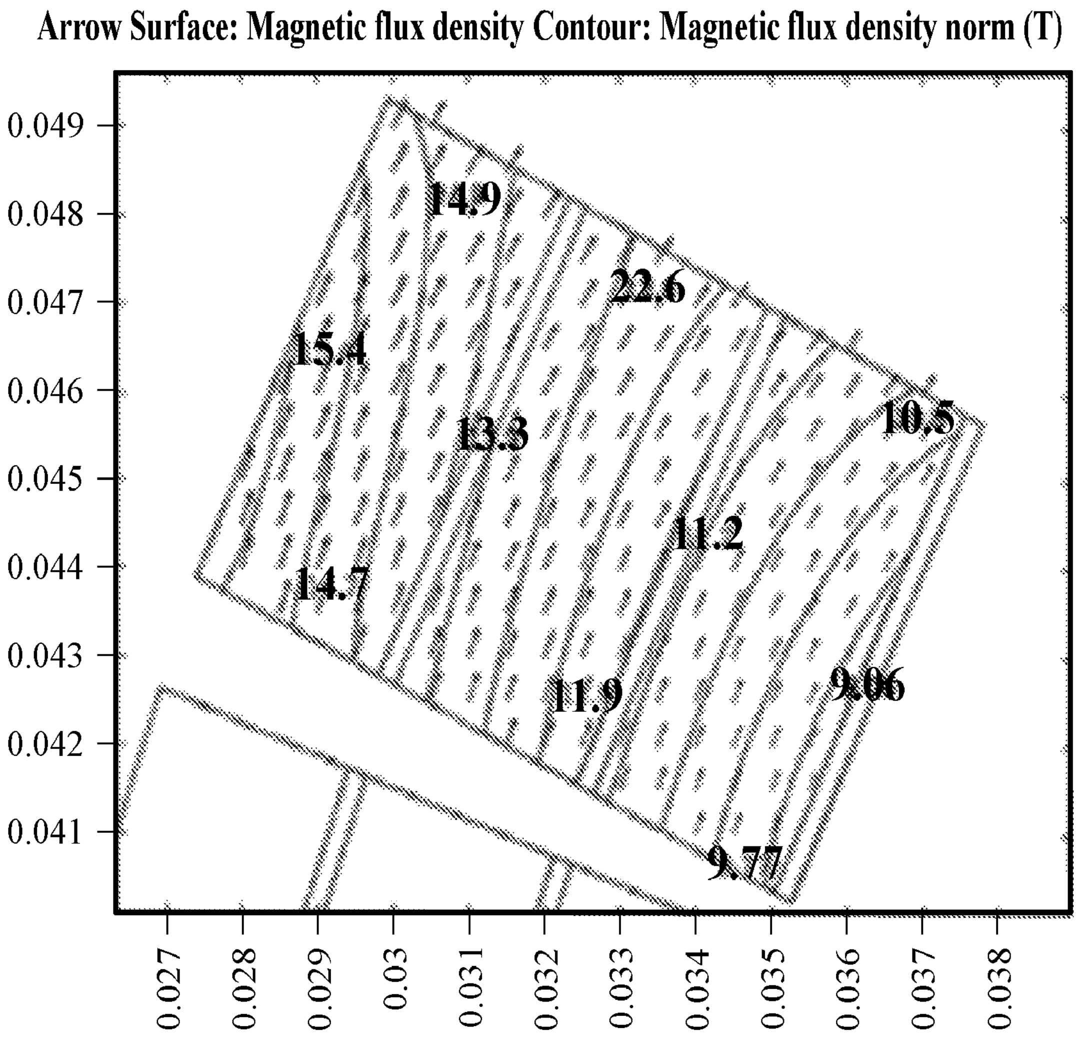
Figure 10C:
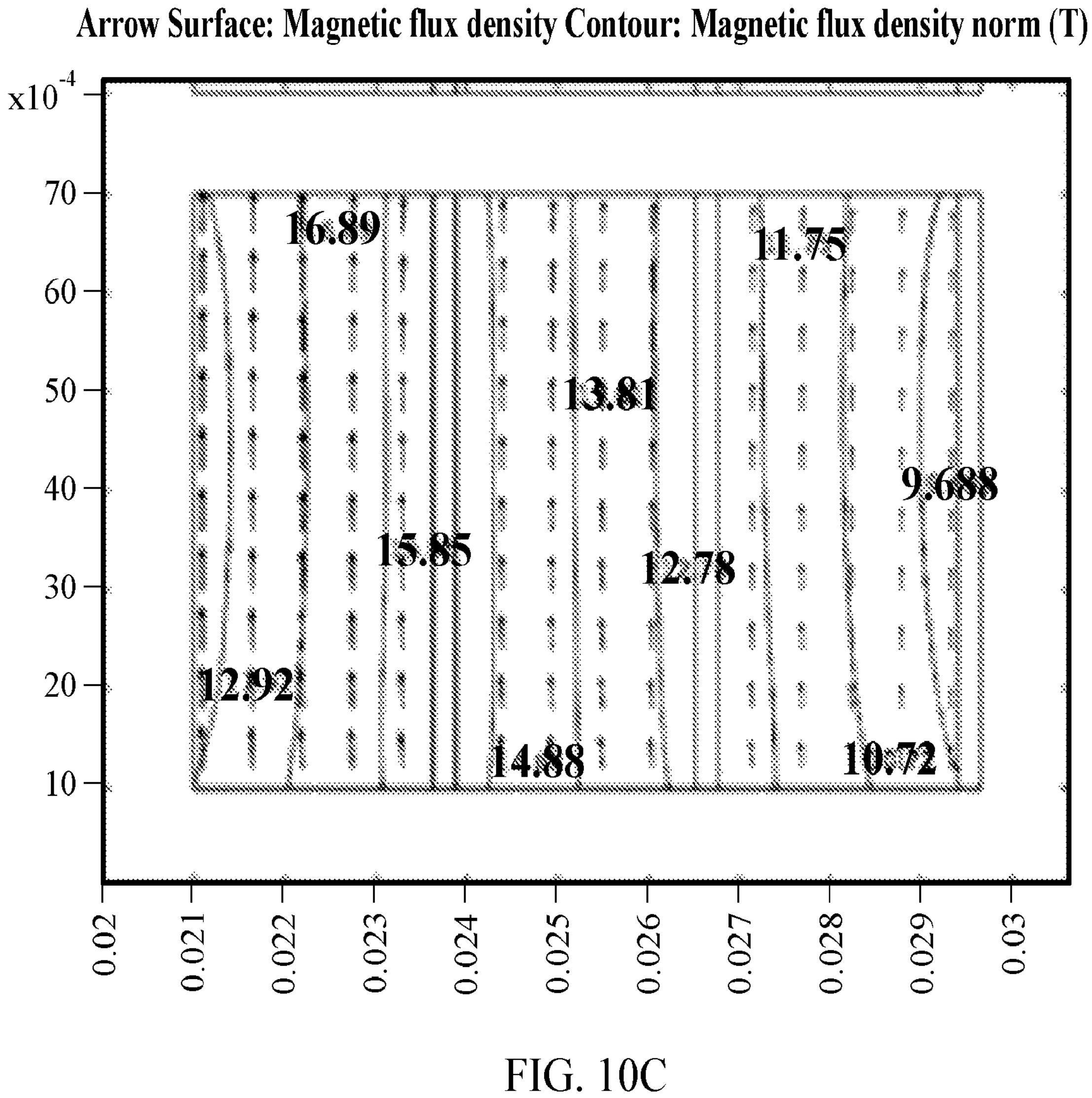

From this simple model, it was predicted that, as coil current is increased from zero, current would accumulate in the outermost tape of each tape-stack cable until the coil current approached $I_{10}$~0.8 $NI_c$(B,T,θ) for that tape. Then, as coil current is further increased, current would share to the neighboring tape until the coil current reached 2 $I_{Ic}$ in the two tapes. As coil current is further increased, current would share to the 3$^{rd}$ tape, etc., until finally current would be ~homogeneous throughout the cable as the current approached an ultimate limit of ~$NI_{10}$. Note that the contact resistance $R_c$ is a strong function of compression (FIG. 5), so that if regions of a tape-stack cable were compressed by more or less pressure the values of λ and τ would change significantly. It is therefore important to design the cable and winding so that the tape-stack cable is maintained under ~MPa compression everywhere in the winding during operation. FIG. 6 and FIG. 8 show the arrangement of non-magnetic structural elements (labeled inner structure and outer structure) and laminar springs that precisely locate each tape-stack cable in the winding geometry. The laminar spring provides an outward-directed force on each tape-stack so that it is always loaded under >1 MPa compression.

Dipole Field Quality for Accelerator Requirements

The positions of the turns of the dipole winding must be placed in the pattern shown in FIG. 7 in order to produce a dipole magnetic field with the homogeneity required to accelerate or collide beams without significant growth in the emittance of a charged particle beam (its transverse size) and for long sustained periods of circulation of the beam in the magnetic fields of the dipole ring. Field homogeneity is expressed by analyzing the spatial dependence of the magnetic field in a multipole expansion:

$$B_x + iB_y = B_0\sum_n b_n\left(\frac{r}{r_0}\right)^n e^{in\theta} \qquad \text{Eq. (13)}$$

The sextupole component $b_2$ of the field distribution is of particular concern for the dipole magnets of an accelerator or collider. It couples the optical focus in a lattice of dipole and quadrupole magnets to have an energy-dependent focal length, which can produce non-linear dynamics of the phase space of the charged particle that are transported in the lattice. The sextupole component can be selectively canceled by placement of one correction turn in the winding. At the selected location, a current in the corrector turn drives the sextupole component of the field distribution disproportionately compared to the dipole or higher-order harmonics, so that the sextupole harmonic can be cancelled by tuning either the position or the current in the correction turn. The particular example magnetic design shown has been optimized to produce nearly pure dipole field over a dynamic range of field 0.2-4 T, in which the amplitudes $b_n$ are all $<10^{-4}$ over that range.

The current-sharing described above poses a further challenge for designing the dipole so that the field distribution is homogeneous over a large dynamic range. In an accelerator or collider, a charged particle beam is typically injected at an energy $E_{inj}$ then accelerated to a collision energy $E_{col}$. Typically $E_{col}$~10 $E_{inj}$, so a large dynamic range is required for homogeneous field operation. When the beams are injected, the Lorentz force tends to displace the current in each turn of tape-stack cable to its outermost tape. When the beams are circulating in a accelerator, the balance of Lorentz force and resistive gradient redistribute current ~equally among the N tapes of each turn of tape-stack cable. The multipoles have been evaluated for a 4T dual dipole design for these two limiting cases: cable current distributed homogeneously in each tape-stack cable (at collision energy), and cable current concentrated in the outermost tape of each tape-stack cable (at injection energy). The difference in the calculated multipoles is $\Delta b_n<10^{-4}$ for all multipoles. This result might seem remarkable, but it is actually a consequence of the conformal design strategy: because each tape-stack cable is oriented so that the tape faces are closely parallel to the field at conductor, the field distribution is insensitive to the horizontal position of the 'current center position' of that cluster. This result is important for the utilization of conformal windings in the dipoles for an accelerator or collider.

Natural Suppression of Persistent-Current Multipoles

In the conformal winding, all tape-stack cables are oriented so that tape faces are closely parallel to the magnetic field at the tape. As the winding current is ramped up or down, there is no induced emf in the plane of any tape, so persistent-current loops are strongly suppressed. This is a unique property of the conformal winding of tape-stacks, not true for any other geometry of wire or cable. The multipoles from persistent-currents are a significant challenge for beam dynamics at injection field for accelerators, and a conformal winding naturally suppresses them.

End Winding

At each end of a dipole winding, the magnetic field flares outward both vertically and horizontally and returns to the surrounding steel flux return, as shown in FIG. 7. In the end region of the dipole, each turn of tape-stack cable must be formed along a catenary curve that connects one turn of the body winding from one side to the other and flares out of the mid-plane to provide clearance for the beam tube of the dipole. It may be feasible to design the flared catenary of each tape-stack cable so that the tape surfaces are everywhere parallel to the flaring magnetic field, in which case the maximum cable current in the end region would be preserved in the flared-ends of the winding just as it is in the body of the winding—the conformal condition would be preserved in the flared ends.

Each flared-end turn may be given a partial-twist as it traverses the first half of the flared catenary, and a reverse partial twist as it traverses the second half of the catenary. The location and magnitude of the twist can be adjusted to conform with the flaring of the vector magnetic field in the end region so as the maintain the conformal condition, as illustrated for the example design of the hybrid dipole shown in FIGS. 11A-11C.

Provision is made to interweave additional tape segments among the N tapes within the flared-end region of each tape-stack cable. The (thicker) region of the interleave is compressed using a laminar spring just in the same way that the tape-stack cable is compressed throughout the body length of the dipole. The reinforced region can accommodate current transfer among the tapes of the tape-stack cable and the reinforcing tapes to provide twice the current-carrying capacity in the end winding region.

A conformal winding of compressed tape-stack cable can be configured as an inner winding for a high-field dipole, to produce a field strength in the aperture that is greater than could be produced by windings of conventional superconductors such as $Nb_3Sn$ and NbTi. All of the attributes discussed above pertain to the use of a conformal tape-stack inner sub-winding in a hybrid-coil dipole. The Bi-2212 insert sub-winding and the $Nb_3Sn$ outer sub-winding are fabricated as separate subassemblies. The $Nb_3Sn$ outer sub-winding requires a high-temperature heat treatment in its final shape to produce the desirable superconducting performance in the constituent wires. The completed sub-winding subassemblies are then assembled with the flux return, preloaded, and interconnected to complete the hybrid dipole.

The attributes discussed above for a conformal-winding dipole can in many cases be realized also in other winding configurations, including solenoids, quadrupoles, toroids, and field windings for motors and generators. The corresponding attributes for conformal windings in each of those applications would be understandable to one who is experienced in superconducting magnet technology.

Conformal Sub-Windings for a High-Field Dipole

A 2-layer conformal sub-winding of REBCO tape-stack in an 18 T hybrid dual dipole designed for the requirements of a 100 TeV hadron collider in a 100 km tunnel was studied. The dipole was originally designed using a $Nb_3Sn$ outer sub-winding and a Bi-2212 inner sub-winding (shown in left half of the quadrant), each composed of SuperCIC round cable. The right half of the quadrant shows replacement of the Bi-2212 winding by a conformal REBCO tape-stack winding. The field homogeneity was preserved, the quantity of superconductor was reduced by half. By the above arguments, persistent-current multipoles from the REBCO sub-winding should be significantly reduced in the conformal winding. This final example illustrates the benefit of the conformal winding strategy for maximum performance from a REBCO winding, so that less of the expensive REBCO superconductor is required for a given application.

Figure 15:
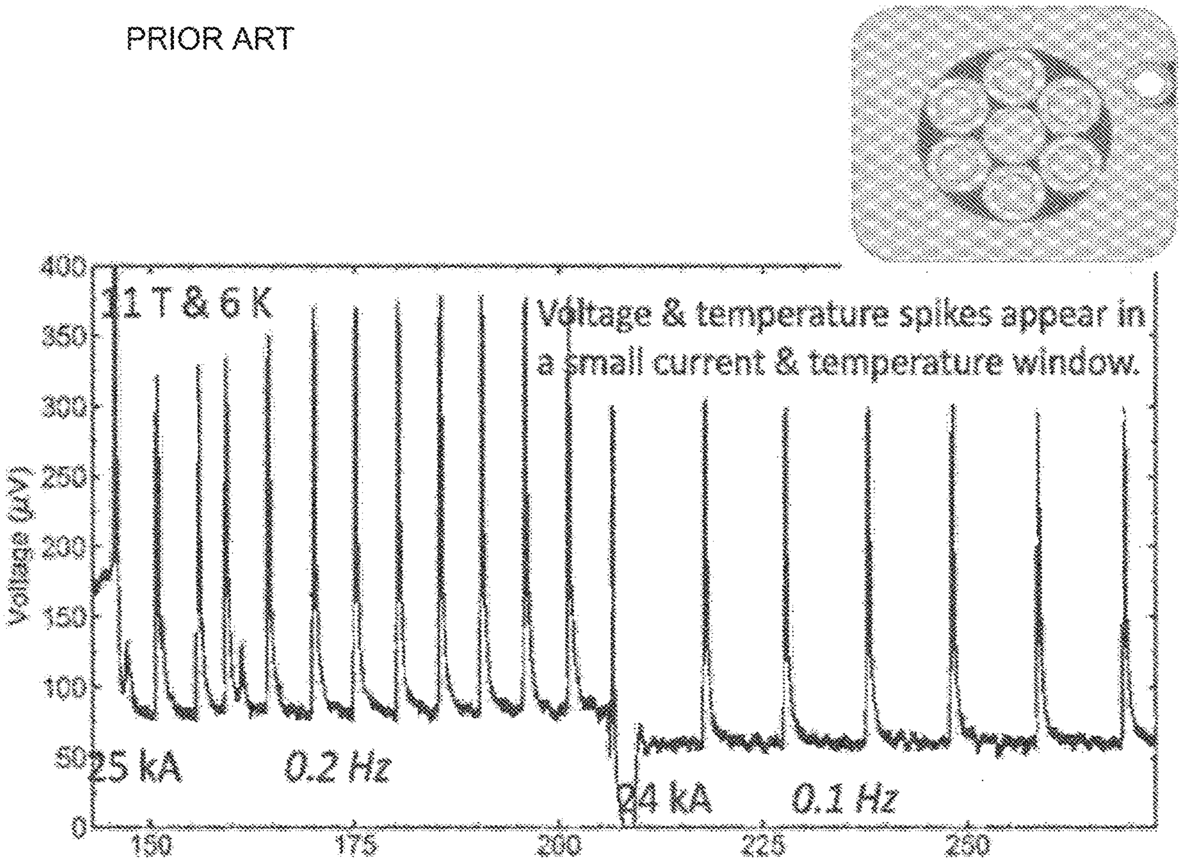
FIG. 15 shows voltage spikes associated with successive stages of current-sharing in the testing of a cable-of-cables containing 6 REBCO CORC conductors.

In the prior art (Mulder et al) current-sharing was observed among 6 REBCO-based CIC conductors that were in turn cabled in a twisted CIC, as shown in FIG. 15. Because the lead configuration to the overall cable fed straightened lengths of the 6 CICs, there was an inductive force that drove current transfer between the twisted CICs along a test loop of the cable, and it produced a sequence of voltage spikes shown in FIG. 15. Those voltage spikes demonstrate that current sharing was driven, but the cable did not quench. In the example winding of Mulder, the REBCO subcables are transposed by twisting and the 6 subcables are further transposed by twisting, so they do not constitute an example of a conformal winding. The overall current-sharing that produces the observed voltage spikes is driven inductively by the planar interconnection of the 6 sub-cables to external current leads. The observed voltage spikes gave evidence of induction-driven current-sharing, and each spike damped after a brief time interval, demonstrating that the dynamics of current sharing disclosed in the above discussion did in fact stabilize the superconducting performance of the aggregate cable. It is therefore a first evidence to substantiate the model of current-sharing stabilization disclosed above.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A conformal dipole winding comprising a superconducting tape configured with a geometry that orients a face of the superconducting tape to be parallel to a local magnetic field produced by the winding along a length of the superconducting tape, wherein the superconducting tape forms a tape-stack cable comprising a stack of a plurality of the superconducting tapes, a copper cladding on all surfaces of each superconducting tape, and a face of each of the copper-clad superconducting tapes which is oriented closely parallel to the local magnetic field and is in face-face contact with adjacent superconducting tapes, further comprising a laminar spring contacting the innermost face of each tape-stack cable, or alternatively the innermost fact of each stack of turns of tape-stack cable, the laminar spring comprising two strips of high-strength metal alloy that form an arched spring and are welded to one another along their common edges to provide a compliant spring action over a range of compression, and further comprising a steel flux return assembly, wherein turns of the tape-stack cable and inner boundaries of the steel flux return assembly are arranged so that all turns of the tape-stack cable are conformal to the local magnetic field at the location of the cable turn; and wherein one turn of the tape-stack cable is located at a position where it selectively controls the sextupole component of the local magnetic field distribution in an aperture of the conformal dipole winding.

2. The conformal dipole winding of claim 1 wherein the laminar spring is located in a cavity between an inner structural element of a winding core of the conformal dipole and an inner boundary face of a turn of the tape-stack cable and is configured to provide an outwardly directed force to compress the tape-stack cable against a boundary surface of an outer structural element of the winding core.

3. The conformal dipole winding of claim 1, further comprising an assembly of inner and outer structural elements and a cavity that supports turns of the tape-stack cable against Lorentz forces that operate upon the superconducting currents flowing within the superconducting tapes of the tape-stack cable in the conformal dipole winding.

4. A flared-end winding assembly of a conformal dipole, the flared-end winding assembly comprising:

a tape-stack cable comprising a plurality of superconducting tapes, wherein a face of each of the plurality of superconducting tapes is oriented parallel to a local magnetic field of the flared-end winding assembly;

wherein turns of each tape-stack cable of the flared-end winding sub-assembly are connected continuously to a corresponding turn of the tape-stack cable on an opposite side of the conformal dipole by a connecting segment that follows a catenary curve that is tangent to and continuous with straight portions of the plurality of superconducting tapes of the tape-stack cable in the body region of the dipole; and wherein the catenary curve includes a deflection out of a plane of symmetry of the flared-end winding assembly that accommodates a beam tube through a dipole aperture of the conformal dipole and also maintains the local face orientation of the tapes to be closely parallel to the flaring vector magnetic field at each location within the flared-end sub-assembly.

5. The flared-end winding sub-assembly of claim 4, wherein a superconducting tape segment is sandwiched between each pair of neighboring superconducting tapes in each turn of the flared-end winding sub-assembly so that the superconducting tape segment is compressed to provide for low-resistance current transfer from the pair of neighboring superconducting tapes to stabilize current transport.

6. The flared-end winding sub-assembly of claim 5, wherein the flared-end winding assembly is impregnated with an electrically insulating medium to form a rigid assembly that immobilizes the flared-end winding assembly against Lorentz forces.

7. A hybrid-coil magnet comprising:

a conformal dipole winding comprising a superconducting tape-stack cable and configured as an inner sub-winding; and an outer sub-winding of a cable-in-conduit comprising superconducting wires, wherein the inner sub-winding and the outer sub-winding are assembled onto an inner core structure and preloaded inside a steel flux return assembly.

8. The hybrid-coil dipole magnet of claim 7, wherein the superconducting wires comprise Nb3Sn.

9. The hybrid-coil dipole magnet of claim 7, wherein the conformal dipole winding comprises a superconducting tape configured with a geometry that orients a face of the superconducting tape to be parallel to a local magnetic field produced by the winding along a length of the superconducting tape in all regions of the body and flared ends of the dipole winding.

* * * * *